(12) United States Patent
Seeley et al.

(10) Patent No.: US 12,285,715 B2
(45) Date of Patent: Apr. 29, 2025

(54) NOBLE GAS RECOVERY SYSTEM

(71) Applicant: Edwards Limited, Burgess Hill (GB)

(72) Inventors: Andrew James Seeley, Burgess Hill (GB); Stephen Bruce Cottle, Burgess Hill (GB); Neil Condon, Burgess Hill (GB); Christopher Mark Bailey, Burgess Hill (GB); Julian Richard Dean, Burgess Hill (GB); Joanne Rachel Greenwood, Burgess Hill (GB); Zachary William Dunbar, Sanborn, NY (US)

(73) Assignee: Edwards Limited, Burgess Hill (GB)

( * ) Notice: Subject to any disclaimer, the term of this patent is extended or adjusted under 35 U.S.C. 154(b) by 0 days.

(21) Appl. No.: 18/006,057

(22) PCT Filed: Jul. 27, 2021

(86) PCT No.: PCT/GB2021/051923
§ 371 (c)(1),
(2) Date: Jan. 19, 2023

(87) PCT Pub. No.: WO2022/023725
PCT Pub. Date: Feb. 3, 2022

(65) Prior Publication Data
US 2023/0277974 A1 Sep. 7, 2023

Related U.S. Application Data

(63) Continuation-in-part of application No. 17/012,430, filed on Sep. 4, 2020, now abandoned.

(30) Foreign Application Priority Data
Jul. 28, 2020 (GB) .................................. 2011649

(51) Int. Cl.
*B01D 53/02* (2006.01)
*B01D 53/047* (2006.01)
(Continued)

(52) U.S. Cl.
CPC ....... *B01D 53/025* (2013.01); *B01D 53/0476* (2013.01); *B01D 53/1493* (2013.01);
(Continued)

(58) Field of Classification Search
None
See application file for complete search history.

(56) References Cited

U.S. PATENT DOCUMENTS 4,725,204 A * 2/1988 Powell ............... C23C 16/4412
417/205
5,069,690 A * 12/1991 Henderson ............... C01B 9/08
95/902
(Continued)

FOREIGN PATENT DOCUMENTS

CN 209271125 U 8/2019
CN 202762287 U 3/2023
(Continued)

OTHER PUBLICATIONS

British Examination Report dated Apr. 9, 2021 and Search Report dated Apr. 8, 2021 for corresponding British Application No. GB2015999.2, 8 pages.
(Continued)

*Primary Examiner* — Jelitza M Perez
(74) *Attorney, Agent, or Firm* — Theodore M. Magee; Westman, Champlin & Koehler, P.A.

(57) ABSTRACT

A system comprising a pumping system configured to pump respective exhaust gases from each of a plurality of chemical etching process chambers and to combine the exhaust gases to provide a combined exhaust gas, and a noble gas recovery
(Continued)

system configured to process the combined exhaust gas to remove one or more noble gases therefrom.

7 Claims, 5 Drawing Sheets

(51) Int. Cl.
  *B01D 53/14* (2006.01)
  *B01D 53/44* (2006.01)
  *B01D 53/54* (2006.01)
  *B01D 53/82* (2006.01)
(52) U.S. Cl.
  CPC .............. *B01D 53/44* (2013.01); *B01D 53/54* (2013.01); *B01D 53/82* (2013.01); *B01D 2256/18* (2013.01); *B01D 2257/102* (2013.01); *B01D 2257/108* (2013.01); *B01D 2257/2066* (2013.01); *B01D 2258/02* (2013.01)

(56) References Cited

U.S. PATENT DOCUMENTS

| | | | |
|---|---|---|---|
| 5,759,237 A | 6/1998 | Li et al. | |
| 5,873,942 A * | 2/1999 | Park | C23C 16/52 417/205 |
| 6,576,573 B2 * | 6/2003 | Arno | B01D 53/32 438/798 |
| 7,527,676 B2 * | 5/2009 | Tajima | B01D 53/025 73/23.39 |
| 2006/0130649 A1 | 6/2006 | Jain et al. | |
| 2012/0085125 A1 | 4/2012 | Wanner et al. | |
| 2014/0352820 A1 * | 12/2014 | Nakazawa | B01D 53/74 422/168 |
| 2022/0032227 A1 | 2/2022 | Seeley et al. | |

FOREIGN PATENT DOCUMENTS

| | | | |
|---|---|---|---|
| DE | 102011050247 A1 | 11/2012 | |
| EP | 0983791 A1 | 3/2000 | |
| JP | 2020119934 A | 8/2020 | |
| TW | 200637644 A | 11/2006 | |
| TW | 201144273 A | 12/2011 | |
| WO | 9936159 A1 | 7/1999 | |
| WO | WO-2006067384 A1 * | 6/2006 | ............. B01D 15/24 |
| WO | 2007091100 A1 | 8/2007 | |

OTHER PUBLICATIONS

PCT Notification of Transmittal of the International Search Report and the Written Opinion of the International Searching Authority, or the Declaration and PCT Search Report dated Oct. 27, 2021 for corresponding PCT application Serial No. PCT/GB2021/051923, 6 pages.

PCT Written Opinion dated Oct. 27, 2021 for corresponding PCT application Serial No. PCT/GB2021/051923, 9 pages.

Taiwanese Office Action dated Jan. 15, 2025 and Search Report dated Dec. 13, 2024 for corresponding Taiwanese application Serial No. 110127757, 13 pages.

* cited by examiner

NOBLE GAS RECOVERY SYSTEM

This application is a Section 371 National Stage Application of International Application No. PCT/GB2021/051923, filed Jul. 27, 2021, and published as WO 2022/023725A1 on Feb. 3, 2022, the content of which is hereby incorporated by reference in its entirety, which is a continuation-in-part of U.S. application Ser. No. 17/012,430, filed Sep. 4, 2020 and which claims priority of British Application No. 2011649.7, filed Jul. 28, 2020.

FIELD

The present invention relates to a noble gas recovery system.

BACKGROUND

Argon and Xenon are used in known etch processes. Whilst Argon is a relatively common air gas, xenon is relatively rare.

Systems for recovering noble gases, such as xenon, from dry etch processes are known. Such systems recover gas from a single etch chamber and return it to the same gas chamber in a closed loop system.

The discussion above is merely provided for general background information and is not intended to be used as an aid in determining the scope of the claimed subject matter. The claimed subject matter is not limited to implementations that solve any or all disadvantages noted in the background.

SUMMARY

Etch processes that utilize Krypton are under development. The viability of such processes may depend on the ability to recover krypton.

The inventors have realised that vacuum and abatement systems may be used to pump gas from multiple gas chambers simultaneously using a common pump and, optionally, abatement system.

The inventors have realised that vacuum (and optionally abatement) systems that pump gas from multiple gas chambers simultaneously using a common pump may be used to recover krypton from multiple gas chambers, thereby improving efficiency and cost-effectiveness.

The present inventors have realised that an open loop system where the krypton is pumped to a collection vessel and stored at a pressure until there is sufficient to run through a final purification process may improve efficiency and cost-effectiveness.

The present inventors have realised that, with a closed loop system, there may need to be redundancy at each stage. An open loop system may reduce such a need.

In a first aspect, there is provided a system comprising a pumping system configured to pump respective exhaust gases from each of a plurality of chemical etching process chambers and to combine the exhaust gases to provide a combined exhaust gas, and a noble gas recovery system configured to process the combined exhaust gas to remove one or more noble gases (such as argon, xenon, or krypton, or any combination, mixture or blend thereof) therefrom.

In a further aspect, there is provided a system comprising a noble gas supply, a plurality of process chambers, a pumping system, and a noble gas recovery system. Each process chamber is configured to operate alongside (for example, contemporaneously, concurrently asynchronously, or simultaneously) with the other process chambers to receive a respective supply of one or more noble gases from the noble gas supply, perform an etching process using said respective supply of one or more noble gases, and output a respective exhaust gas. The pumping system is configured to pump the respective exhaust gases from the plurality of process chambers, combine the exhaust gases to provide a combined exhaust gas, and to pump said combined exhaust gas to the noble gas recovery system. The noble gas recovery system is configured to process the received combined exhaust gas to remove one or more noble gases therefrom.

Advantageously, the use of krypton or xenon in the process chambers tends to achieve higher levels of precision and uniformity in high aspect ratio etch processes than tends to be possible with lower mass bombardment gases, such as argon.

Noble gases such as krypton and xenon naturally occur in air but at low concentrations. The energy to separate a noble gas from air may be approximately inversely proportional to its concentration in the gas from which it is to be separated. The energy required to separate a krypton (or xenon) from air is relatively high, due the low concentration of that gas in air. Since the krypton (or xenon) tends to be at a much higher concentration in the process exhaust (compared to in air), the energy to separate it tends to be much lower. Thus, recovering the krypton or xenon from the combined exhaust gas tends to provide for reduced energy consumption. Recovering the krypton or xenon from the combined exhaust gas tends to secure the krypton or xenon supply at a reasonable energy cost. The recovery process tends not to be dependent on another gas that has similar high energy recovery costs or supply risks. In any aspect, the pumping system may comprise a common pump configured to pump the respective exhaust gases from the plurality of process chambers.

In any aspect, the pumping system may comprise a plurality of pumps (for example turbo pumps), each pump in the plurality of pumps configured to pump the exhaust gas from a respective one of the plurality of process chambers.

In any aspect, the noble gas recovery system may comprise a purification module configured to purify the combined exhaust gas. The purification module may be configured to remove gases from the combined exhaust gas using an absorber.

In any aspect, the noble gas recovery system may comprise a polishing module configured to perform a polishing process on the combined exhaust gas.

In any aspect, the noble gas recovery system may comprise a separation module configured to separate noble gas from the other components of the combined exhaust gas. The separation module may be configured to use at least gas chromatography to separate noble gases from a wide variety of other gases in the combined exhaust gas.

In any aspect, the noble gas recovery system may further comprise: a compression module configured to compress the separated one or more noble gases output by the separation module; and a storage module configured to store the compressed separated one or more noble gases. The storage module may be configured to output its contents responsive to its contents reaching a threshold level.

In any aspect, the noble gas recovery system may further comprise a distribution module configured to distribute, to the plurality of process chambers, the separated one or more noble gases output by the separation module. The noble gas recovery system may further comprise a plurality of blender boxes. Each blender box may be configured to: receive a respective first supply of one or more noble gases from the distribution module; receive a respective second supply of one or more noble gases from a further supply; mix the received first and second supplies of one or more noble gases; and supply the mixture to a respective process chamber.

In a further aspect, there is provided a method comprising: simultaneously providing to each process chamber of a plurality of process chambers, from a noble gas supply, a respective supply of one or more noble gases; simultaneously performing, by each process chamber, an etching process using said respective supply of one or more noble gases; simultaneously outputting, by each process chamber, a respective exhaust gas; pumping, by a pumping system, the respective exhaust gases from the plurality of process chambers; combining, by the pumping system, the exhaust gases to provide a combined exhaust gas; pumping, by the pumping system, said combined exhaust gas to a noble gas recovery system; and processing, by the noble gas recovery system, the received combined exhaust gas to remove one or more noble gases therefrom.

The processing may comprise separating, by a separation module, the one or more noble gases from the other components of the combined exhaust gas.

The method may further comprise: compressing, by a compression module, the separated one or more noble gases; storing, by a storage module, the compressed separated one or more noble gases; and, responsive to contents of the storage module reaching a threshold level, extracting, from the storage module, the contents of the storage module.

The method may further comprise distributing, by a distribution module, the separated one or more noble gases to the plurality of process chambers.

The combined exhaust gases may be combined, mixed, or blended with a purge gas.

The pumping system may be configured to receive a purge gas and combine the exhaust gases with the purge gas. The system may further comprise a vacuum pressure swing adsorption module configured to separate the purge gas from the combined exhaust gas. The purge gas may be nitrogen. The vacuum pressure swing adsorption module may be configured to provide the separated purge gas to the pumping system.

The noble gas recovery system may comprise a gas chromatography separation module configured to separate one or more noble gases from the other components of the combined exhaust gas using a gas chromatography process. The gas chromatography separation module may be configured to receive a carrier gas for use in transfer of the combined exhaust gas through the gas chromatography separation module. The noble gas recovery system may comprise a separation module to separate the one or more noble gases from the carrier gas. The gas chromatography separation module may be configured to receive a carrier gas for use in transfer of the combined exhaust gas through the gas chromatography separation module. The noble gas recovery system may comprise a further separation module to separate the other components of the combined exhaust gas from the carrier gas. The carrier gas may be recycled/re-used by the gas chromatography separation module.

The carrier gas used preferably has different properties from the gas being recovered (i.e., krypton or xenon) so that the separation stages can differentiate it. Preferably, the carrier gas is inert, or at least does not react with any of the other gases in the process. An objective of the claimed system is to recover high molecular weight noble gases such as krypton or xenon. The carrier gas should therefore preferably be a light, inert gas. Preferably, the carrier gas is helium.

Whilst the etch process may include helium and may be able to accommodate helium being introduced with the krypton or xenon, this may introduce a risk of variability and dependency on an uncontrolled flow. This may introduce unacceptable variation to the etch process. Preferably, precise process control on high aspect ratio etch processes where krypton or xenon is being introduced is provided. This tends to increase process consistency—both wafer to wafer and uniformity across the wafer.

Helium is not an air gas. Sourcing of helium tends to be expensive and takes significant energy. Furthermore, supply of helium for use in the semiconductor industry can be unreliable. By recycling/re-using the helium carrier gas, overall energy consumption may be reduced. Furthermore, the reliability of the helium supply may be improved, which tends to improve consistency and reduce variability in the etch processes.

The noble gas recovery system may comprise an acid gas removal module configured to remove acidic gases from the combined exhaust gas.

The noble gas recovery system comprises a wet scrubber configured to perform a scrubbing process on the combined exhaust gas. The noble gas recovery system may comprise a drier configured to perform a drying process on a gas stream output from the wet scrubber.

The pumping system may comprise: a plurality of pumps, each pump in the plurality of pumps configured to pump the exhaust gas from a respective one of the plurality of process chambers; and a plurality of perfluorocompound (PFC) removal or conversion modules configured to remove PFCs from gas streams output by the plurality of pumps or to convert the PFCs into other compounds, each one or the plurality of PFC removal or conversion modules being coupled to a respective one of the plurality of pumps. One or more of the PFC removal or conversion modules may comprise a burners, a plasma reactors, a combined plasma catalysis (CPC) modules, and/or abatements apparatus.

Preferably, the PFC removal or conversion modules comprise plasma reactors or modules that use plasma.

The plasma converts the PFCs into gases that can be dissolved in suitable dosed (treated) water. The plasma by-products can then be continuously removed from the system, e.g. by the wet scrubber, and may be discharged, for example, into the facility acid exhaust and drain systems that are typically in the etch area of a fab. Advantageously, wet scrubbers tend not to be large and tend not to add additional load onto the acid exhaust and drain.

Accordingly, PFCs and pyrophoric gases tend to be destroyed before entering the vacuum pump module. This advantageously tends to mean that less nitrogen purge may be used into the pump e.g. for flammability protection purposes. By reducing the amount of additional nitrogen purge gas used, removal of the nitrogen purge gas, which would add additional complexity to the system and increase its footprint and cost of ownership, tends to be avoided.

Advantageously, the wet scrubber (which may be a dosed wet scrubber) may remove the foreline plasma by-products, through the acid exhaust. The noble gases may pass through to the gas chromatography separation module and then the krypton or xenon can be polished. This tends to enable the minimisation of a pressure swing absorption (PSA) unit that can effectively separate the noble gases and/or other contaminants from the krypton or xenon prior to passing the gas through a gas chromatography column. The PSA tends to achieve purification at just above atmospheric pressure (circa 5 psi), which tends mean lower operating energy or cost requirements.

Advantageously, use of plasma reactors and wet scrubber to remove PFC and pyrophoric gases tends to reduce overall footprint of the system. For example, the etch processes in the process chambers may use krypton at the same time as PFCs. Even if there are times in the process when only krypton is flowing, where the system is recovering krypton from multiple asynchronous chambers, the system allows for krypton and PFCs flowing together. A plasma may be used to react the PFCs into products that can be dissolved in water in the wet scrubber such that they can be removed from the system. An alternative method would be to use an absorber which could either be located in the vacuum foreline or in the atmospheric line. If the absorber is located in the vacuum foreline, it may have to be extremely large to ensure that it does not cause an unacceptable restriction which would prevent process pressure being achieved in the process chambers. Thus, footprint would be increased. On the other hand, an absorber located after the pump would need to be sized for the additional dilution gas that is used to protect the pump from corrosion from the PFCs. An atmospheric absorber would therefore need to be sized to accommodate that flow and replaced frequently, incurring both space and parts cost.

The noble gas recovery system may comprise a getter module comprising a getter. The getter may be titanium.

The pumping system may be configured to receive a purge gas and combine the exhaust gases with the purge gas; and the noble gas recovery system may comprise: an acid gas removal module coupled to the pumping system and configured to remove acidic gases from the combined exhaust gas received from the pumping system; a vacuum pressure swing adsorption module configured receive a gas stream from the acid gas removal module and to separate the purge gas from the received gas stream; and a gas chromatography separation module configured to receive a gas stream from the vacuum pressure swing adsorption module, to separate one or more noble gases from the other components of the gas stream received from the vacuum pressure swing adsorption module using a gas chromatography process, and to output the separated one or more noble gases.

The pumping system may comprise: a plurality of pumps, each pump in the plurality of pumps configured to pump the exhaust gas from a respective one of the plurality of process chambers; and a plurality of perfluorocompound (PFC) removal or conversion modules configured to remove PFCs from gas streams output by the plurality of pumps or to convert the PFCs into other compounds, each one of the plurality of PFC removal or conversion modules being coupled to a respective one of the plurality of pumps; and the noble gas recovery system may comprise: a wet scrubber configured to perform a scrubbing process on the combined exhaust gas; and, optionally, a drier configured to perform a drying process on a gas stream output from the wet scrubber. The noble gas recovery system may further comprise: a gas chromatography separation module configured to receive a gas stream from the wet scrubber or the drier, to separate one or more noble gases from the other components of the gas stream received from the wet scrubber or the drier using a gas chromatography process, and to output the separated one or more noble gases. Each of the plurality of PFC removal or conversion modules may comprise a plasma, e.g. a plasma reactor.

The pumping system may be configured to receive a purge gas and a further purge gas, and combine the exhaust gases with the purge gas and the further purge gas; and the noble gas recovery system may comprise: a vacuum pressure swing adsorption module configured receive a gas stream from the pumping system and to separate the purge gas from the received gas stream; a getter module comprising a getter, the getter module configured to receive a gas stream from the vacuum pressure swing adsorption module, and to remove a gas from the gas stream received from the vacuum pressure swing adsorption module; and a separation module configured to receive a gas stream from the getter module and to separate the one or more noble gases in the received gas stream from the further purge gas in the received gas stream, and to output the separated one or more noble gases.

The Summary is provided to introduce a selection of concepts in a simplified form that are further described in the Detailed Description. This summary is not intended to identify key features or essential features of the claimed subject matter, nor is it intended to be used as an aid in determining the scope of the claimed subject matter.

DETAILED DESCRIPTION

Figure 1:
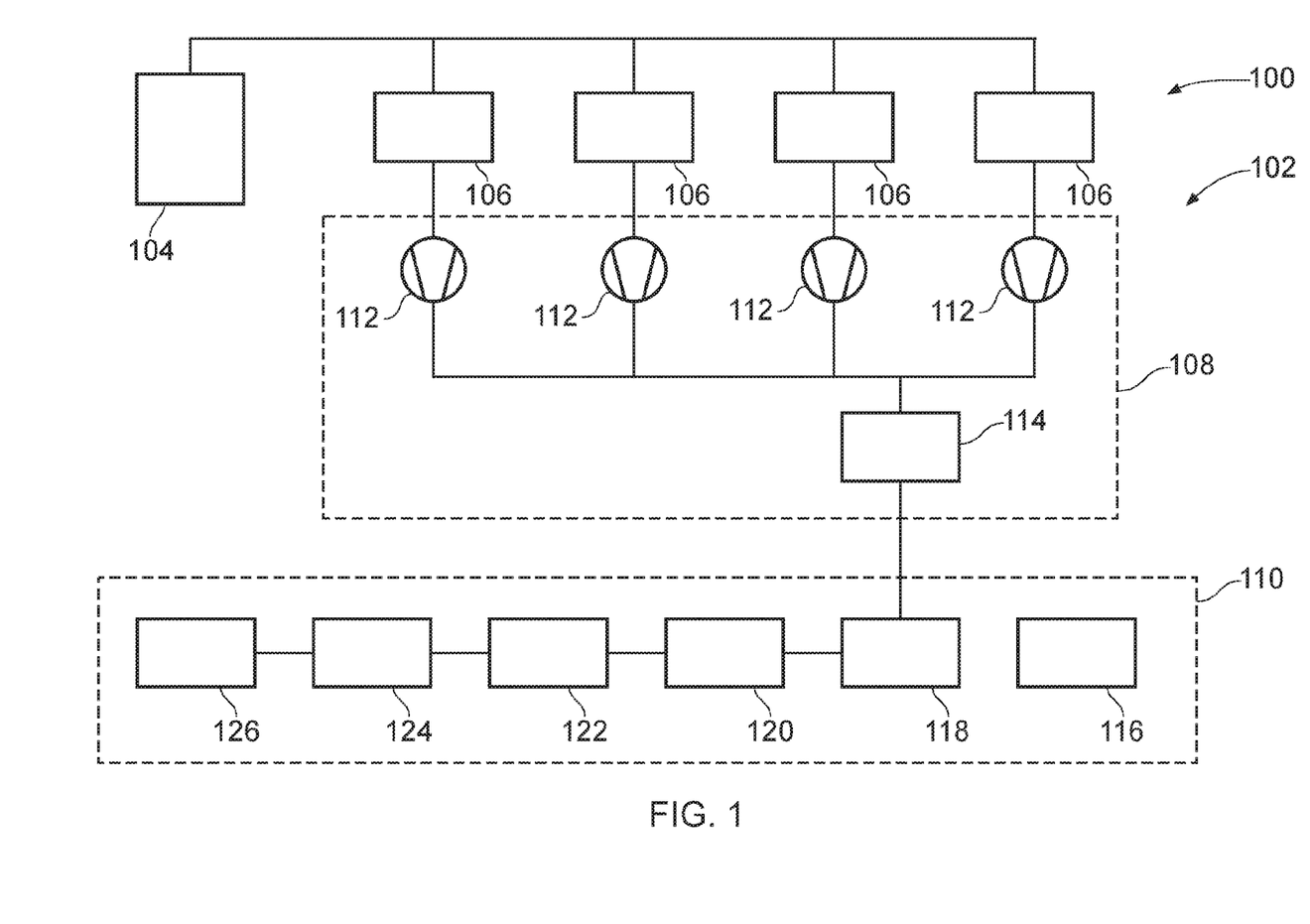
FIG. 1 is a schematic illustration (not to scale) of a microfabrication system and an open loop noble gas recovery system.

FIG. 1 is a schematic illustration (not to scale) of a microfabrication system 100 and an open loop exhaust gas processing system 102, in accordance with an embodiment.

The microfabrication system 100 comprises a krypton supply 104 and a plurality of process chambers 106.

The krypton supply 104 is configured to supply krypton gas to each of the plurality of process chambers 106.

Each of the process chambers 106 is configured to, using the received krypton gas, perform an etch process to chemically remove layers from surfaces of wafers located therein.

The exhaust gas processing system 102 is operably coupled to the microfabrication system 100. The exhaust gas processing system 102 is configured to recover the krypton used for etching by the microfabrication system 100.

The exhaust gas processing system 102 comprises a pumping system 108 and a krypton recovery system 110.

The pumping system 108 is configured to pump (e.g. at about atmospheric pressure) exhaust gas from the plurality of process chambers 106 to the krypton recovery system 110.

The pumping system 108 comprises a plurality of turbo pumps 112 and a pumping module 114.

Each turbo pump 112 is coupled to a respective process chamber 106. Each turbo pump 112 is configured to pump exhaust gases from the process chamber 106 to which it is coupled to the pumping module 114.

The pumping module 114 comprises a pump. The pumping module 114 is configured to pump exhaust gases from the turbo pumps 112 to the krypton recovery system 110. In operation, the pumping module 114 receives respective flows of exhaust gas from the turbo pumps 112. The pumping module 114 combines the received flows of exhaust gas into a single combined flow of gas. The pumping module 114 pumps the combined flow of gas to the krypton recovery system 110.

In some embodiments, the pumping module 114 is further configured to receive (e.g. to pump) a further gas, which is a purge gas. The pumping module 114 may be configured to blend or mix the pumped exhaust gases with the pumped purge gas. This mixture or combination of exhaust gases and purge gas may then be pumped to the krypton recovery system 110. Advantageously, the addition of this purge gas tends to extend the operational lifetime of the pumping module 114.

The quantity and composition of the purge gas may be application dependent, and selected based on system requirements and/or operation. The quantity and composition of the purge gas may be selected to facilitate downstream separation of one or more noble gases (i.e. krypton in this embodiment) from other constituents of the gas mixture. In some embodiments, it may be beneficial if the purge gas is specifically selected such that it is easy to separate from krypton, by one or other means, in the separation module 120 of a krypton recovery system 110. In some embodiments, the purge gas may comprise, wholly or in part, gas that would otherwise be rejected from the separation module 120, after having been separated from krypton. This tends to have the effect of simplifying the separation process. In addition, this tends to increase efficiency and reduce the cost of ownership of the system as a whole, since additional gases are typically consumed within the separation module, and may be re-used if recirculated via the pump purge.

The krypton recovery system 110 comprises a control module 116, a purification module 118, a separation module 120, a polishing module 122, a compression module 124, and a storage module 126.

The control module 116 is configured to control operation of the other modules of the krypton recovery system 110. I.e. the control module 116 controls operation of the purification module 118, the separation module 120, the polishing module 122, the compression module 124, and the storage module 126.

The purification module 118 is configured to receive the combined flow of gas from the pumping module 114. The purification module 118 is configured to purify the received combined flow of gas, thereby to provide a purified gas stream. The purification module 118 may be configured to remove toxic and corrosive gases from the combined flow of gas, for example, by facilitating a chemical or physical reaction between certain gases and one or more solid materials, at ambient or elevated temperature. In some embodiments, an absorber may be implemented. The purification module 118 is configured to provide the purified gas stream to the separation module 120.

The separation module 120 is configured to receive the purified gas stream from the purification module 118. The separation module 120 is configured to separate the krypton from the other components of the purified gas stream, thereby to provide a gas flow comprising separated krypton. The separation module 120 may be configured to use gas chromatography to separate the large, heavy and therefore slow krypton molecules from the lighter inert gases. The separation module 120 is configured to provide the separated krypton to the polishing module 122.

The polishing module 122 is configured to receive the separated krypton from the separation module 120. The polishing module 122 is configured to perform a polishing process on the gas flow comprising separated krypton, thereby to provide a polished gas flow. The term "polishing" may be understood to refer to removal of trace contaminants excluding noble gases. The polishing process may be performed using chemical means, or physical means, or more preferably a combination of chemical and physical means. The polishing module 122 is configured to provide the polished gas flow to the compression module 124.

In some embodiments, the polishing module 122 is omitted from the open loop system of FIG. 1. In such embodiments, polishing may be performed at a later stage, for example on contents retrieved from the storage module 126, and may, for example, be performed at a location or other facility that is remote from the system 100.

In this embodiment, the polishing module 122 is connected between the separation module 120 and the compression module 124. However, in other embodiments, the polishing module 122 is connected between a different pair of modules. For example, in some embodiments, the polishing module 122 is connected between the compression module 124 and the storage module 126 instead of between the separation module 120 and the compression module 124. In such other embodiments, the polishing module 122 is arranged to perform the polishing process on a compressed gas flow received from the compression module 124, and to output the polished, compressed gas to the storage module 126.

The compression module 124 comprises a compressor. In this embodiment, the compression module 124 is configured to receive the polished gas flow from the polishing module 122. The compression module 124 is configured to compress the polished gas flow, thereby to provide a compressed gas flow. The compressed gas flow has a high pressure, i.e. greater than atmospheric pressure. The pressure of the compressed gas flow may be application dependent, and may be selected to ensure that a threshold amount of gas can be stored at a given volume. The compression module 124 is configured to provide the compressed gas flow to the storage module 126.

The storage module 126 is configured to receive the compressed gas flow from the compression module 124. The storage module 126 is configured to store the received compressed gas.

The storage module 126 may continue to receive and store the krypton-containing gas until the amount of gas and/or the amount of krypton stored therein reaches a threshold level. Once the amount of gas and/or the amount of krypton stored in the storage module 126 reaches said threshold level, a further (e.g. final) purification process may be performed on the stored gas to recover the krypton therein. The krypton stored in the storage module may be returned to the krypton supply 104 or used for a different purpose (e.g. after performance of the further purification process in some embodiments).

Thus, a microfabrication system 100 and open loop exhaust gas processing system 102 is provided.

Figure 2:
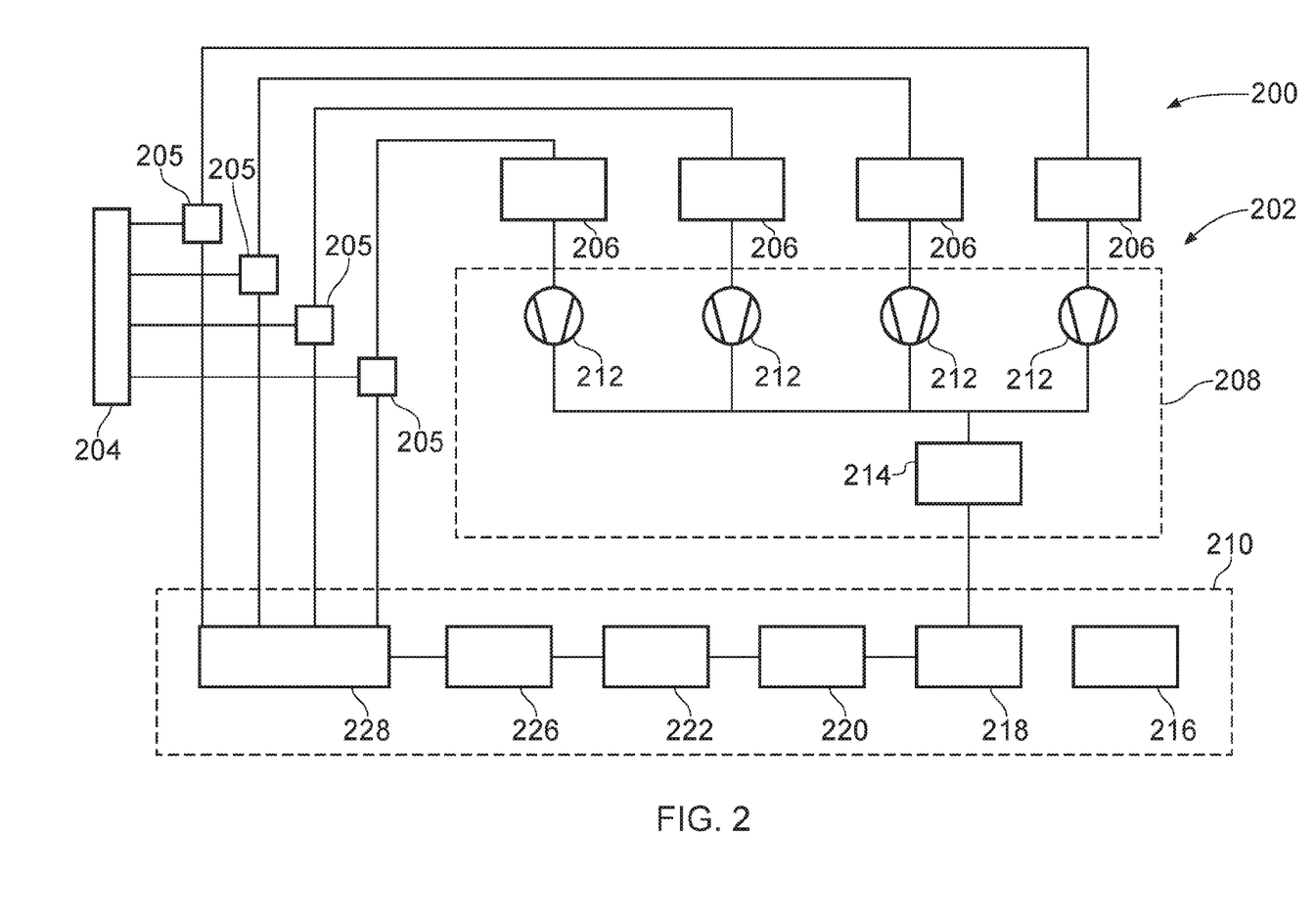
FIG. 2 is a schematic illustration (not to scale) of a microfabrication system and a closed loop noble gas recovery system.

FIG. 2 is a schematic illustration (not to scale) of a microfabrication system 200 and a closed loop exhaust gas processing system 202, in accordance with an embodiment.

The microfabrication system 200 comprises a krypton supply 204, a plurality of blender boxes 205, and a plurality of process chambers 206.

The krypton supply 204 is configured to supply krypton gas to each of the plurality of blender boxes 205.

Each of the blender boxes 205 is configured to receive a respective supply of krypton from the krypton supply 204. Each of the blender boxes 205 is further configured to receive a respective supply of krypton from a distribution module 228 of the exhaust gas processing system 202, the function of which is described in more detail later below. Each of the blender boxes 205 is further configured to mix or blend the krypton received from the krypton supply 204 and the distribution module 228 to form a respective blended supply of krypton.

Each of the blender boxes 205 is coupled to a respective process chamber 206. Each of the blender boxes 205 is further configured to supply its respective blended supply of krypton to the respective process chamber 206 to which it is coupled. The blending or mixing performed by each blender box 205 may be such that each process chamber 206 is supplied with a desired or required amount of krypton. The blending or mixing performed by each blender box 205 may be performed to adjust the purity of the gas sent to the process chambers 206, for example in cases where the krypton from the supply 204 and distribution module 228 may have different levels of trace impurities.

Each of the process chambers 206 is configured to, using the received krypton gas, perform an etch process to chemically remove layers from surfaces of wafers located therein.

The exhaust gas processing system 202 is operably coupled to the microfabrication system 200. The exhaust gas processing system 202 is configured to recover the krypton used for etching by the microfabrication system 200.

The exhaust gas processing system 202 comprises a pumping system 208 and a krypton recovery system 210.

The pumping system 208 is configured to pump (e.g. at about atmospheric pressure) exhaust gas from the plurality of process chambers 206 to the krypton recovery system 210.

The pumping system 208 comprises a plurality of turbo pumps 212 and a pumping module 214.

Each turbo pump 212 is coupled to a respective process chamber 206. Each turbo pump 212 is configured to pump exhaust gas from the process chamber 206 to which it is coupled to the pumping module 214.

The pumping module 214 comprises a pump. The pumping module 214 is configured to pump exhaust gas from the turbo pumps 212 to the krypton recovery system 210. In operation, the pumping module 214 receives respective flows of exhaust gas from the turbo pumps 212. The pumping module 214 combines the received flows of exhaust gas into a single combined flow of gas. The pumping module 214 pumps the combined flow of gas to the krypton recovery system 210.

In some embodiments, the pumping module 214 is further configured to receive (e.g. to pump) a further gas, which is a purge gas. The pumping module 214 may be configured to blend or mix the pumped exhaust gases with the pumped purge gas. This mixture or combination of exhaust gases and purge gas may then be pumped to the krypton recovery system 210. Advantageously, the addition of this purge gas tends to extend the operational lifetime of the pumping module 214.

As in other embodiments, the quantity and composition of the purge gas may be application dependent, and selected based on system requirements and/or operation. The quantity and composition of the purge gas may be selected to facilitate downstream separation of the krypton from other constituents of the gas mixture. In some embodiments, it may be beneficial if the purge gas is specifically selected such that it is easy to separate from krypton, by one or other means, in the separation module 220 of the krypton recovery system 210. In some embodiments, the purge gas may comprise, wholly or in part, gas that would otherwise be rejected from the separation module 220, after having been separated from krypton. This tends to have the effect of simplifying the separation process. In addition, this tends to increase efficiency and reduce the cost of ownership of the system as a whole, since additional gases are typically consumed within the separation module, and may be re-used if recirculated via the pump purge.

The krypton recovery system 210 comprises a control module 216, a purification module 218, a separation module 220, a polishing module 222, a storage module 226, and a distribution module 228.

The control module 216 is configured to control operation of the other modules of the krypton recovery system 210. I.e. the control module 216 controls operation of the purification module 218, the separation module 220, the polishing module 222, the storage module 226, and the distribution module 228.

The purification module 218 is configured to receive the combined flow of gas from the pumping module 214. The purification module 218 is configured to purify the received combined flow of gas, thereby to provide a purified gas stream. The purification module 218 may be configured to remove toxic and corrosive gases from the combined flow of gas using an absorber such as a GRC column. The purification module 218 is configured to provide the purified gas stream to the separation module 220. In this closed loop system, the purification module 218 advantageously tends to ensure no unwanted contaminants are returned to the process chambers 206.

The separation module 220 is configured to receive the purified gas stream from the purification module 218. The separation module 220 is configured to separate the krypton from the other components of the purified gas stream, thereby to provide a gas flow comprising separated krypton. The separation module 220 may be configured to use gas chromatography to separate the large, heavy and therefore slow krypton molecules from the lighter inert gases. The separation module 220 is configured to provide the gas flow comprising separated krypton to the polishing module 222.

The polishing module 222 is configured to receive the separated krypton from the separation module 220. The polishing module 222 is configured to perform a polishing process on the separated krypton, thereby to provide a polished gas flow. The polishing module 222 is configured to provide the polished gas flow to the storage module 226.

In this embodiment, the polishing module 222 is connected between the separation module 220 and the storage module 226. However, in other embodiments, the polishing module 222 is connected between a different pair of modules. For example, in some embodiments, the closed loop system comprises a compression module (such as that described in more detail earlier above with reference to FIG. 1). The polishing module 222 may be preceded by a compression module. The polishing module 222 is arranged to perform the polishing process on a compressed gas flow received from the compression module, and to output the polished, compressed gas to the storage module 226. In some embodiments, the polishing module 222 is connected to a compression module that is downstream of the polishing module 222, and the polishing module 222 outputs a polished gas flow to the compression module.

In some embodiments, the polishing module 222 is omitted from the closed loop system of FIG. 2.

The storage module 226 is configured to receive the polished gas flow from the polishing module 222. The storage module 226 is configured to store the received polished gas. The storage module 226 is configured to provide the stored krypton-containing gas to the distribution module 228. In some embodiments, this storage module 226 may be omitted.

The distribution module 228 is configured to receive the krypton-containing gas from the storage module 226. The distribution module 228 is configured to distribute the received krypton-containing gas between the blender boxes 205 coupled thereto. The distribution module 228 is configured to split or separate a flow of krypton-containing gas received from the storage module 226 into a plurality of separate gas flows, and to provide each of those separate gas flow to a respective blender box 205. Thus, krypton is recovered and recycled.

An advantage provided by the above-described systems is that the cost and the physical footprint of the krypton recovery system is shared across multiple process chambers, thereby increasing efficiency (e.g. in terms of physical size) per processing chamber.

In the above embodiments, the pump of the pumping module 114, 214 may be considered to be a common pump, i.e. a pump that is common to all of the process chambers 106, 208.

Further details of krypton recovery systems that may be implemented with the open loop exhaust gas processing system 102 described in more detail above with respect to FIG. 1 and/or the closed loop exhaust gas processing system 202 described in more detail above with respect to FIG. 2 will now be described with reference to FIGS. 3 to 5.

Figure 3:
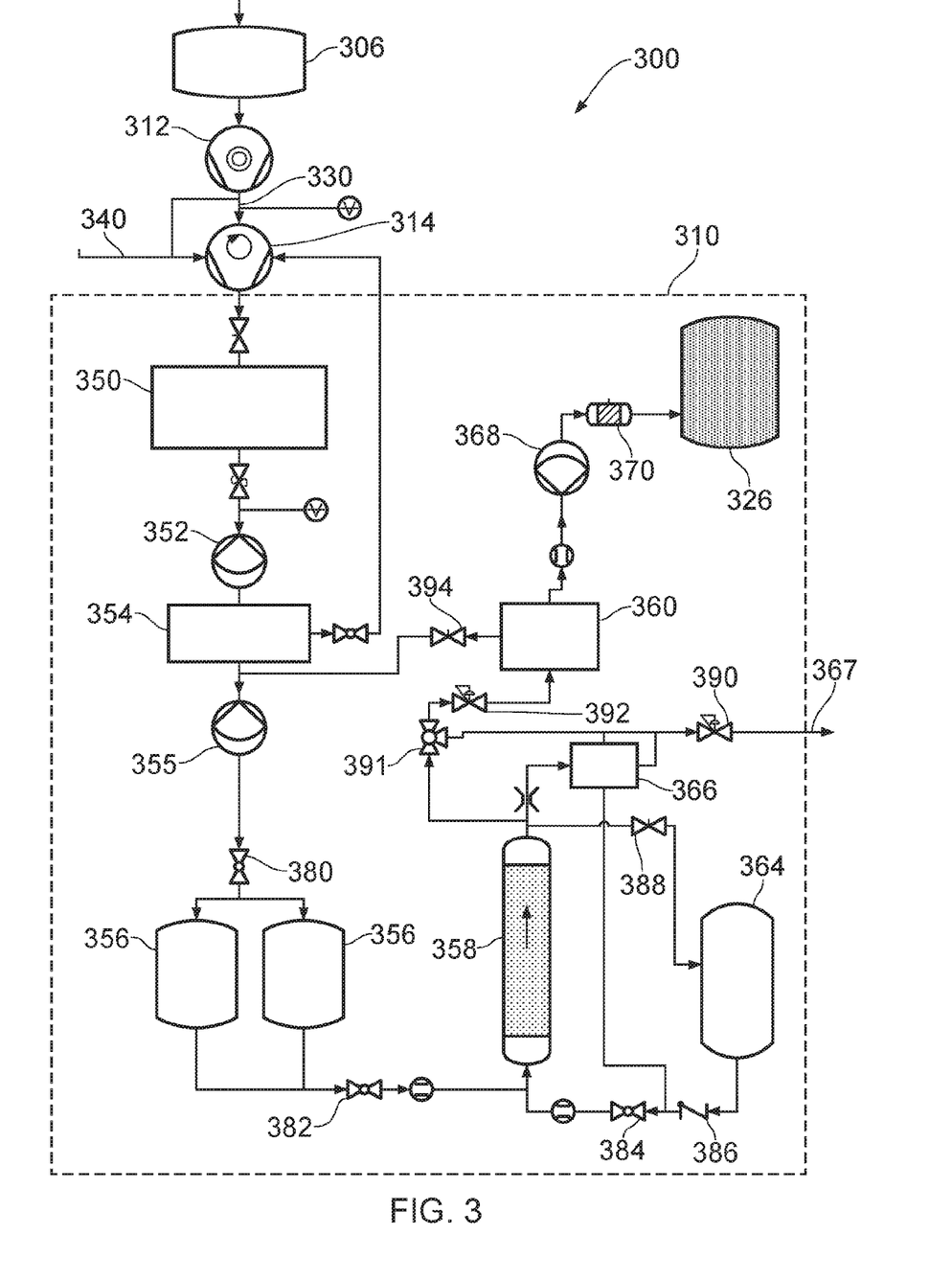
FIG. 3 is a schematic illustration (not to scale) showing further details of a portion of a microfabrication system.

FIG. 3 is a schematic illustration (not to scale) showing further details of a portion of a microfabrication system 300.

The portion of the microfabrication system 300 shown in FIG. 3 comprises a process chamber 306, a turbo pump 312, a pumping module 314, and a krypton recovery system 310.

The process chamber 306 may be the same as or similar to one or more of the process chambers 106, 206 described in more detail earlier above with reference to FIGS. 1 and/or 2. Although only a single process chamber 306 is shown in FIG. 3, it will be appreciated that in practice, in this embodiment, there are in fact a plurality of process chambers 306.

The turbo pump 312 may be the same as or similar to one or more of the turbo pumps 112, 212 described in more detail earlier above with reference to FIGS. 1 and/or 2. Although only a single turbo pump 312 is shown in FIG. 3, it will be appreciated that in practice, in this embodiment, there are in fact a plurality of turbo pumps 312. Each turbopump 312 is coupled to a respective process chamber 306 and is configured to pump exhaust gas from the respective process chamber 306.

The pumping module 314 may be the same as or similar to one or both of the pumping modules 114, 214 described in more detail earlier above with reference to FIGS. 1 and/or 2. The pumping module 314 comprises a pump, which may be a dry pump. The pumping module 314 is configured to pump exhaust gases from each of the turbo pumps 312, via a manifold 330, to the krypton recovery system 310. The pumping module 314 combines the received flows of exhaust gas into a single combined flow of gas and pumps the combined flow of gas to the krypton recovery system 310.

In this embodiment, the pumping module 314 is further configured to receive (e.g. to pump) a purge gas. The flow of the purge gas into the pumping module 314 and/or manifold is indicated in FIG. 3 by arrows and a reference numeral 340. The pumping module 314 is configured to blend or mix the pumped exhaust gases with the pumped purge gas. This mixture or combination of exhaust gases and purge gas is then pumped to the krypton recovery system 310. Advantageously, the addition of this purge gas tends to extend the operational lifetime of the pumping module 314.

In this embodiment, the purge gas is nitrogen.

The quantity and composition of the purge gas may be application dependent, and selected based on system requirements and/or operation. The quantity and composition of the purge gas may be selected to facilitate downstream separation of one or more noble gases (i.e. krypton in this embodiment) from other constituents of the gas mixture.

In this embodiment, the krypton recovery system 310 comprises an acid gas removal module 350, a first compressor 352, a vacuum pressure swing adsorption (VPSA) module 354, a second compressor 355, a plurality of first storage modules 356, a gas chromatography module 358, a separation module 360, a carrier gas supply 364, a thermal conductivity detector (TCD) 366, a third compressor 368, a purification module 370, and a krypton storage module 326.

The acid gas removal module 350 is coupled to the pumping module 314. The acid gas removal module 350 is configured to receive the combined flow of gas from the pumping module 314. The acid gas removal module 350 is configured to remove toxic, corrosive and/or acidic compounds, e.g. toxic, corrosive and/or acidic gases, from the received combined flow of gas. The acid gas removal module 350 may be a gas reactor column (GRC). The acid gas removal module 350 is configured to provide the gas stream (after removal of the toxic, corrosive and/or acidic compounds) to the first compressor 352.

The first compressor 352 is configured to receive the gas stream output by the acid gas removal module 350. The first compressor 352 is configured to compress the received gas stream, thereby to provide a compressed gas stream. The first compressor 352 is configured to provide the compressed gas stream to the VPSA module 354.

The VPSA module 354 is configured to receive the compressed gas stream from the first compressor 352. The VPSA module 354 is configured to separate the purge gas (and optionally other gas species) from a mixture of gases in the compressed gas stream. The VPSA module 354 separates gases under pressure according to the species' molecular characteristics and affinity for an adsorbent material used in the VPSA module 354. Preferably, the VPSA module 354 separates a maximum amount of the purge gas, i.e. nitrogen in this embodiment, from the compressed gas stream. In practice, the VPSA module 354 may remove/separate, for example, approximately 95% of the nitrogen present in the compressed gas stream.

The VPSA module 354 is coupled to the pumping module 314 such that the separated purge gas is returned to the pumping module 314 for purging processes, i.e. the nitrogen purge gas is re-used or recycled.

The VPSA module 354 is coupled to the second compressor 355 such that the other gas species (i.e. other than the nitrogen purge gas) separated by the VPSA module 354 are sent to the second compressor 355.

The second compressor 355 is configured to receive the gas stream output by the VPSA module 354. The second compressor 355 is configured to compress the received gas stream, thereby to provide a compressed gas stream. The second compressor 355 is configured to provide the compressed gas stream to the first storage modules 356.

The second compressor 355 is coupled to the first storage modules 356 via a first valve 380. The first valve 380 is a two-way valve. The first valve 380 is configured to be controlled (e.g. by a control module such as control module 116 or control module 216 described in more detail above with reference to FIGS. 1 and 2) to control the flow of gas between the second compressor 355 and the first storage modules 356.

The first storage modules 356 are configured to receive and store the gas received from the VPSA module 354. The gas stream received by the first storage modules 356 may be a compressed stream, i.e. under pressure. Thus, in this embodiment, the first storage modules 356 receive and store a gas stream that has had at least some toxic, corrosive and/or acidic compounds, and at least a portion of the purge gas removed.

Each first storage module 356 is coupled to the gas chromatography module 358 such that gas stored in the first storage module 356 may be supplied to the gas chromatography module 358.

Each first storage module 356 is coupled to the gas chromatography module 358 via a second valve 382. The second valve 382 is a three-way valve. The second valve 382 is configured to be controlled (e.g. by a control module such as control module 116 or control module 216 described in more detail above with reference to FIGS. 1 and 2) to control the flow of gas between the first storage modules 356 and the gas chromatography module 358.

The gas chromatography module 358 is configured to receive, at its inlet, a gas stream from the first storage modules 356. The gas chromatography module 358 may comprise a gas chromatography column. Although only one gas chromatography module 358 (i.e. gas chromatography column) is shown in FIG. 3, it will be appreciated that, in practice, there may be a plurality of gas chromatography module/columns 358. The plurality of gas chromatography module/columns 358 may be arranged to operate in parallel, or in series.

The gas chromatography module 358 is configured to separate the krypton from the other components of the received gas stream using gas chromatography. In this embodiment, in operation, lighter gases exit the gas chromatography module 358 first, and then heavier gases (i.e. krypton in this embodiment) exit the gas chromatography module 358 afterwards (i.e. at a later time).

In this embodiment, the inlet of the gas chromatography module 358 is coupled to a carrier gas supply 364 such that the gas chromatography module 358 receives a carrier gas from the carrier gas supply 364. In this embodiment, the carrier gas is helium. The carrier gas is used by the gas chromatography module 358 to assist in separation of the krypton from other gas species in the received gas stream. In particular, the carrier gas is used to transfer, or carry, the received gas stream through the gas chromatography module 358.

The gas chromatography module 358 is coupled to the carrier gas supply 364 via a third valve 384 and a fourth valve 386. The third valve 384 is a two-way valve. The third valve 384 is configured to be controlled (e.g. by a control module such as control module 116 or control module 216 described in more detail above with reference to FIGS. 1 and 2) to control the flow of the carrier gas between the carrier gas supply 364 and the gas chromatography module 358. The fourth valve 386 is a non-return valve.

The gas chromatography module 358 is coupled, at its outlet, to the TCD 366.

The TCD 366 is configured to sense changes in the thermal conductivity of the gases exiting the gas chromatography module 358 to detect when different species of gases (e.g. krypton) are being output. The TCD 366 may compare pure helium against the gas coming out of the gas chromatography module 358 over time and may be calibrated to detect when the krypton is eluted from the gas chromatography module 358.

The outlet of the chromatography module 358 is coupled, via the TCD 366, to the carrier gas supply 364, a system outlet 367, and the separation module 360.

The outlet of the chromatography module 358 is coupled to the carrier gas supply 364 via a fifth valve 388. The fifth valve 388 is a two-way valve. The fifth valve 388 is configured to be controlled (e.g. by a control module such as control module 116 or control module 216 described in more detail above with reference to FIGS. 1 and 2) to control the flow of a gas output by the gas chromatography module 358 to the carrier gas supply 364.

The output of the chromatography module 358 is coupled to the system outlet 367 via a sixth valve 390. The sixth valve 390 is a two-way valve. The sixth valve 390 is configured to be controlled (e.g. by a control module such as control module 116 or control module 216 described in more detail above with reference to FIGS. 1 and 2) to control the flow of a gas output by the gas chromatography module 358 to the system outlet 367.

The output of the chromatography module 358 is coupled to the separation module 360 via seventh and eighth valves 391, 392. The seventh valve 391 is a three-way valve. The eight valve 392 is a two-way valve. The seventh and eighth valves 391, 392 are each configured to be controlled (e.g. by a control module such as control module 116 or control module 216 described in more detail above with reference to FIGS. 1 and 2) to control the flow of a gas output by the gas chromatography module 358 to the separation module 360.

In this embodiment, responsive to the TCD 366 detecting helium (i.e. the carrier gas) being output from the gas chromatography module 358, the valves 388, 390, 391, 392 are controlled to route the gas (i.e. the helium) output from the chromatography module 358 to the carrier gas supply 364. Thus, the helium carrier gas can be re-used/recycled.

Also, responsive to the TCD 366 detecting waste gasses (which may, for example, be heavier than helium but lighter than krypton) being output from the gas chromatography module 358, the valves 388, 390, 391, 392 are controlled to route the gases (i.e. the waste gases mixed with helium) output from the chromatography module 358 to the system outlet 367. These waste gasses may be abated and disposed of. The waste gases may include, but are not limited to argon, nitrogen, and/or oxygen gases which may be mixed with the helium carrier.

Also, responsive to the TCD 366 detecting krypton being output from the gas chromatography module 358, the valves 388, 390, 391, 392 are controlled to switch to routing the output gas (i.e. the krypton mixed with helium) output from the chromatography module 358 to the first separation module 360.

In other embodiments, a different arrangement of valves to that shown in FIG. 3 may be implemented to route the gases exiting the gas chromatography module 358. Also, in other embodiments, a different technology for detecting which species of gases are present in the output gases may be implemented, instead of or in addition to the TCD 366.

In operation, the separation module 360 receives from the gas chromatography module 358 a gas stream comprising a mixture of krypton and the helium carrier. The separation module 360 is configured to process this gas stream to separate the krypton from the helium carrier gas. Any appropriate gas separation technique may be used by the separation module 360. For example, the separation module 360 may comprise a membrane, a filter, a metal-organic framework (MOF), or a gas chromatography separation module, to separate the krypton from the helium carrier.

The separation module 360 is further configured to output the separated krypton, for example, to the krypton storage module 326 as shown in FIG. 3, or a distribution module 228 such as that shown in FIG. 2 and described in more detail earlier above. The krypton storage module 326 may be similar to or the same as the storage module 126 described in more detail earlier above with reference to FIG. 1. In this embodiment the separation module 360 is coupled to the krypton storage module 326 via the third compressor 368 and the purification module 370, which compress and purify the krypton, respectively, prior to it being stored in the krypton storage module 326. In some embodiments, the third compressor 368 and/or the purification module 370 is omitted.

The purification module 370 is configured to receive the krypton output by the separation module 360. The purification module 370 is configured to purify the received krypton. Any appropriate purification process may be performed, for example pressure swing adsorption purification or cryogenic purification.

The separation module 360 is further configured to output the separated helium carrier gas, and to send the helium carrier gas back to the second compressor 355, whereby the helium may be re-used/recycled. A ninth valve 394 may regulate flow of helium back to the second compressor 355 from the separation module 360. The ninth valve 394 is a two-way valve. The ninth valve 394 is configured to be controlled (e.g. by a control module such as control module 116 or control module 216 described in more detail above with reference to FIGS. 1 and 2).

In some embodiments, separation module 360 is further configured to output the separated helium carrier gas, and to send the helium carrier gas back to the carrier gas supply 364.

Thus, an embodiment of a krypton recovery system is provided.

Figure 4:
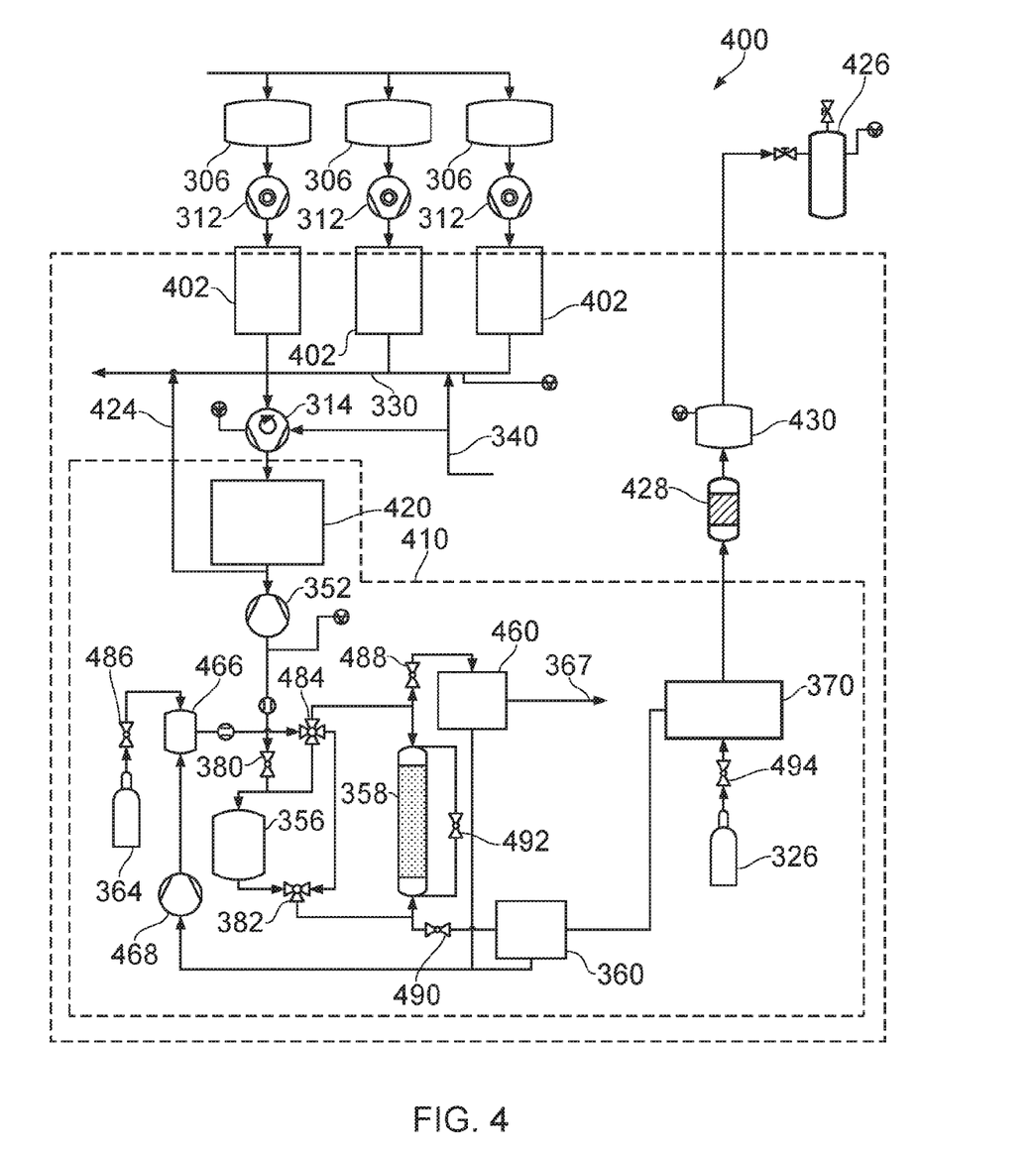
FIG. 4 is a schematic illustration (not to scale) showing further details of a portion of a further microfabrication system.

FIG. 4 is a schematic illustration (not to scale) showing further details of a portion of a microfabrication system 400.

Elements that are common to the embodiments shown in FIGS. 3 and 4 are indicated using the same reference numerals.

The portion of the microfabrication system 400 shown in FIG. 4 comprises a plurality of process chambers 306, a plurality of turbo pumps 312, a manifold 330, a pumping module 314, and a krypton recovery system 410.

The process chambers 306, the turbo pumps 312, the manifold 330, and the pumping module 314 are as described in more detail above with reference to FIG. 3, and will not be described again for the sake of brevity.

In this embodiment, the portion of the microfabrication system 400 further comprises a plurality of perfluorocompound (PFC) removal or conversion modules, hereinafter referred to as "PFC removal modules" 402. Each PFC removal module 402 is coupled between a respective turbo pump 312 and the manifold 330.

The PFC removal modules 402 are configured to remove PFCs from gas streams output by the turbo pumps 312, or to convert the PFCs into other compounds. The PFC removal modules 402 may implement any appropriate PFC removal process. The PFC removal modules 402 may include, but are not limited to, burners, plasma reactors, combined plasma catalysis (CPC) modules, abatements modules, and the like.

In some embodiments, the krypton recovery system 410 may be the same as the krypton recovery system 310 shown in FIG. 3 and described in more detail earlier above. In some embodiments, the krypton recovery system 410 may be the same as the krypton recovery system 310, except with the acid gas removal module replaced by a wet scrubber (such as that described below). In some embodiments, the krypton recovery system 410 may be the same as the krypton recovery system 310, except with the VPSA module 354 omitted. In some embodiments, the krypton recovery system 410 may be the same as the krypton recovery system 310, except with the acid gas removal module replaced by a wet scrubber (such as that described below) and with the VPSA module 354 omitted.

In this embodiment, the krypton recovery system 410 comprises a scrubber 420, a first compressor 352, a first storage module 356, a gas chromatography module 358, the separation module 360, a further separation module 460, a carrier gas supply 364, a second storage module 466, a fourth compressor 468, and (optionally) a purification module 370. The krypton recovery system 410 further comprises the first valve 380, the second valve 382, a tenth valve 484, an eleventh valve 486, a twelfth valve 488, a thirteenth valve 490, a fourteenth valve 492, and a fifteenth valve 494. The first compressor 352, the first storage module 356, the gas chromatography module 358, the separation module 360, the carrier gas supply 364, and the valves 380-382 are as described in more detail above with reference to FIG. 3, and will not be described again for the sake of brevity.

The scrubber 420 is coupled to the pumping module 314. The scrubber 420 is configured to receive the combined flow of gas from the pumping module 314. The scrubber 420 is configured to remove certain substances (e.g. toxic, corrosive and/or acidic compounds or gases) from the gas stream flowing through it. In this embodiment, the scrubber 420 is a wet scrubber configured to introduce a scrubbing liquid, for example water, into the gas stream flowing through the scrubber 420. For example, the scrubber 420 may spray the gas stream with the scrubbing liquid, or may force the gas stream through a reservoir of the scrubbing liquid, or may implement some other contact method. In this embodiment, the scrubber 420 receives a supply of the scrubbing liquid, for example water, and outputs used scrubbing liquid, as indicated in FIG. 4 by arrows and the reference numeral 424.

Preferably, a drier is coupled to the outlet of the scrubber 420 to dry (i.e. remove liquid and/or vapour) from the gas stream output by the scrubber 420.

The scrubber 420 is configured to provide the scrubbed/washed gas stream to the first compressor 352.

The gas chromatography module 358 is coupled to the carrier gas supply 364 via the eleventh valve 486, the second storage module 466, the tenth valve 484, and the second valve 382. The tenth valve 484 is a four-way valve. The eleventh valve 486 is a two-way valve. The tenth and eleventh valves 484, 486 are configured to be controlled (e.g. by a control module such as control module 116 or control module 216 described in more detail above with reference to FIGS. 1 and 2). The eleventh valve 486 is controlled to control the flow of the carrier gas between the carrier gas supply 364 and the second storage module 466. The second storage module 466 is configured to receive and store the carrier gas received from the carrier gas supply 364. The second storage module 466 is configured to provide the carrier gas to the gas chromatography module 358 for use in the gas chromatography separation process. The second and tenth valves 382, 484 may be controlled to regulate the supply of the carrier gas to the gas chromatography module 358.

The gas chromatography module 358 is coupled to the separation module 360 and the further separation module 460.

An output of the chromatography module 358 is coupled to the further separation module 460 via the twelfth valve 488. The twelfth valve 488 is a two-way valve. The twelfth valve 488 is configured to be controlled (e.g. by a control module such as control module 116 or control module 216 described in more detail above with reference to FIGS. 1 and 2) to control the flow of a gas output by the gas chromatography module 358 to the further separation module 460.

Also, an output of the chromatography module 358 is coupled to the separation module 360 via a thirteenth valve 490. The thirteenth valve 490 is a two-way valve. The thirteenth valve 490 is configured to be controlled (e.g. by a control module such as control module 116 or control module 216 described in more detail above with reference to FIGS. 1 and 2) to control the flow of a gas output by the gas chromatography module 358 to the separation module 360.

In this embodiment, the valves 488 and 490 are controlled such that the relatively lighter gases (mixed with the helium carrier gas) that exit the gas chromatography module 358 are routed to the further separation module 460, whereas the relatively heavier gases, i.e. the krypton, (mixed with the helium carrier gas) that exit the gas chromatography module 358 are routed to the separation module 360. Any appropriate process may be used to detect when krypton is exiting the gas chromatography module 358 and control the valves 488, 490 to correctly route the output gas. For example, a TCD may be implemented in a similar fashion to that described above with reference to FIG. 3.

In operation, the further separation module 460 receives from the gas chromatography module 358 a gas stream comprising a mixture of the relatively lighter gases (which may include, for example, argon, nitrogen, and/or oxygen gases) and the helium carrier. The further separation module 460 is configured to process this gas stream to separate the relatively lighter gases from the helium carrier gas. Any appropriate gas separation technique may be used by the further separation module 460.

The further separation module 460 is further configured to output the separated relatively lighter gases from the system 400. These gases may be output to an abatement system.

The further separation module 460 is further configured to output the separated helium carrier gas, and to send the helium carrier gas back to the second storage module 466, where it is stored and subsequently re-used/recycled. In this embodiment, the further separation module 460 is coupled to the second storage module 466 via the fourth compressor 468 which compresses the helium prior to it being stored in the second storage module 466.

In operation, the separation module 360 receives from the gas chromatography module 358 a gas stream comprising a mixture of krypton and the helium carrier. The separation module 360 is configured to process this gas stream to separate the krypton from the helium carrier gas. Any appropriate gas separation technique may be used by the separation module 360. For example, the separation module 360 may comprise a membrane, a filter, or a metal-organic framework (MOF) to separate the krypton from the helium carrier.

The separation module 360 is further configured to output the separated krypton, for example, to a krypton storage module 326 as shown in FIG. 4, or a distribution module 228 such as that shown in FIG. 2 and described in more detail earlier above. The krypton storage module 326 may be similar to or the same as the storage module 126 described in more detail earlier above with reference to FIG. 1.

The separation module 360 is further configured to output the separated helium carrier gas, and to send the helium carrier gas back to the second storage module 366, where it is stored and subsequently re-used/recycled. In this embodiment, the separation module 360 is coupled to the second storage module 366 via the fourth compressor 468 which compresses the helium prior to it being stored in the second storage module 366.

In this embodiment, optionally the input and output of the gas chromatography module 358 are coupled together via a pipe and fourteenth valve 492. The fourteenth valve 492 is a two-way valve. The fourteenth valve 492 is configured to be controlled (e.g. by a control module such as control module 116 or control module 216 described in more detail above with reference to FIGS. 1 and 2) to control the flow of a gas output by the gas chromatography module 358 back to the input of the to the gas chromatography module 358. Thus, gas output by the gas chromatography module 358 can be recirculated through the gas chromatography module 358 to undergo a further gas chromatography separation process.

The optional purification module 370 is coupled between the separation module 360 and the krypton storage module 326. The krypton storage module 326 is described in more detail above with reference to FIG. 3, and will not be described again for the sake of brevity.

The purification module 370 is configured to receive the krypton output by the separation module 360. The purification module 370 is configured to purify the received krypton. Any appropriate purification process may be performed, for example pressure swing adsorption purification or cryogenic purification. The purification module 370 is configured to output the purified krypton to either the krypton storage module 326 or to a further krypton storage module 426 (via an optional polishing module 428 and/or buffer volume 430). The routing of the purified krypton to either the krypton storage module 326 or the further krypton storage module 426 is controlled by the fifteenth valve 494. The fifteenth valve 494 is a two-way valve. The fifteenth valve 494 is configured to be controlled (e.g. by a control module such as control module 116 or control module 216 described in more detail above with reference to FIGS. 1 and 2) to control the routing of the purified krypton to either the krypton storage module 326 or the further krypton storage module 426.

The optional polishing module 428 may be the same as or similar to one or both of the polishing modules 122, 222 described in more detail earlier above with reference to FIGS. 1 and/or 2.

The buffer volume 430 may be a storage tank or container or the like for storing purified krypton (e.g. temporarily) before it is transferred to the further krypton storage module 426. Thus, a further embodiment of a krypton recovery system is provided.

Figure 5:
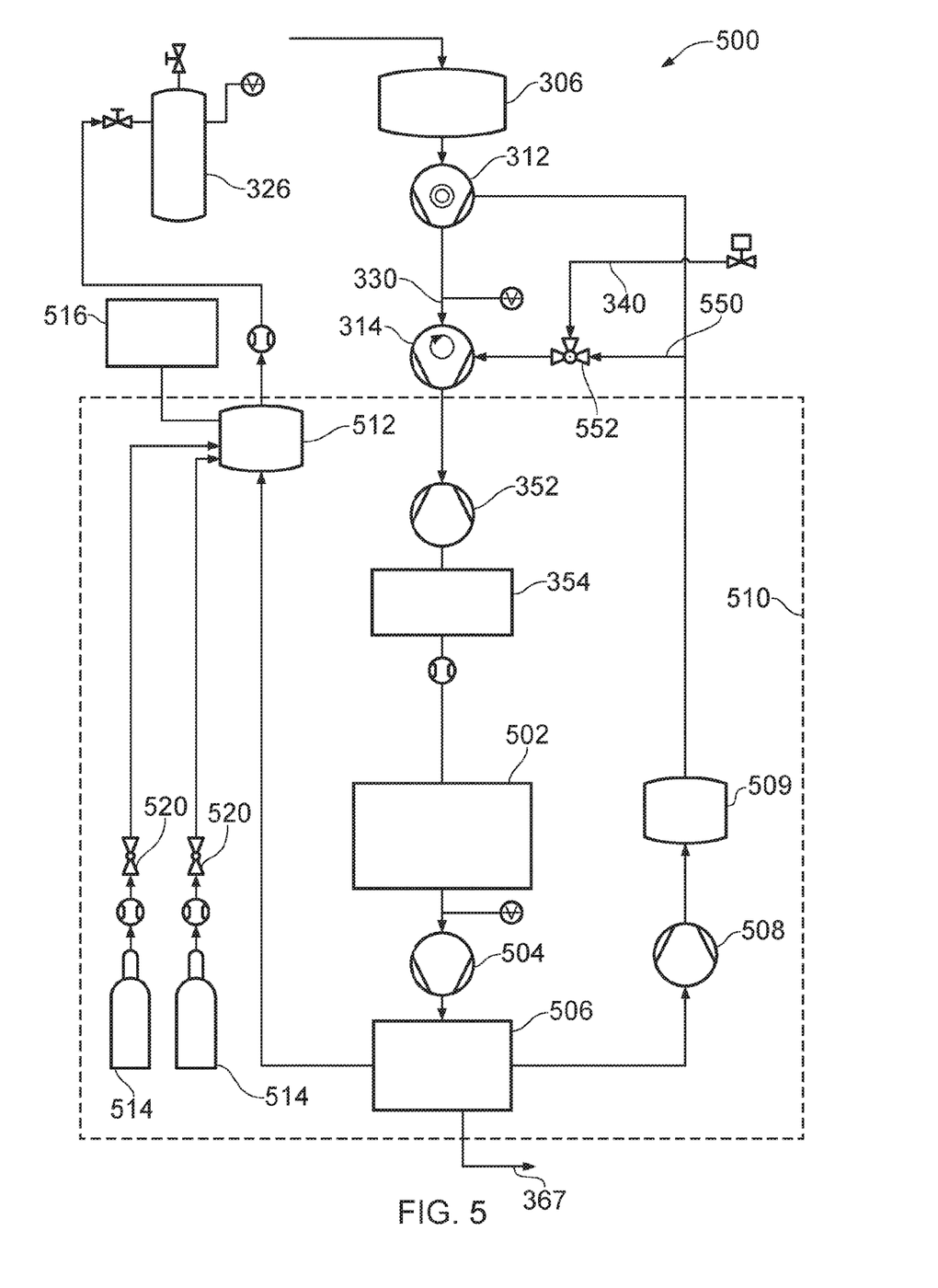
FIG. 5 is a schematic illustration (not to scale) showing further details of a portion of a yet further microfabrication system.

FIG. 5 is a schematic illustration (not to scale) showing further details of a portion of a microfabrication system 500.

Elements that are common to the embodiments shown in FIGS. 3 to 5 are indicated using the same reference numerals.

The portion of the microfabrication system 500 shown in FIG. 5 comprises a process chamber 306, a turbo pump 312, a manifold 330, a pumping module 314, and a krypton recovery system 510.

The process chambers 306, the turbo pumps 312, the manifold 330, and the pumping module 314 are as described in more detail above with reference to FIG. 3, and will not be described again for the sake of brevity.

Although only a single process chamber 306 and only a single turbo pump 312 is shown in FIG. 5, it will be appreciated that in practice, in this embodiment, there are in fact a plurality of process chambers 306 and turbo pumps 312, each turbopump 312 being coupled to a respective process chamber 306.

In this embodiment, in addition to being configured to receive the purge gas (i.e. nitrogen), as indicated in FIG. 5 by arrows and a reference numeral 340, the pumping module 314 is further configured to receive a further gas (which may be considered to be a further purge gas). In this embodiment, this further purge gas in an inert gas such as helium. The flow of the further purge gas into the pumping module 314 and/or manifold is indicated in FIG. 5 by arrows and a reference numeral 550. The flow of the further purge gas into the pumping module 314 may be regulated by a ninth valve 552. The ninth valve 552 is configured to be controlled (e.g. by a control module such as control module 116 or control module 216 described in more detail above with reference to FIGS. 1 and 2) to control the flow of the further purge gas to the pumping module 314.

The further purge gas may also be supplied to the turbo pump 312.

The pumping module 314 and/or the turbo pump 312 are configured to blend or mix the pumped exhaust gases with further purge gas (and the purge gas in the case of the pumping module 314).

The pumping module 314 is configured to pump the mixture of gases to the first compressor 352 of the krypton recovery system 510.

In this embodiment, the krypton recovery system 510 comprises a first compressor 352, a VPSA module 354, a getter module 502, a first pump 504, a third separation module 506, a second pump 508, a first buffer volume 509, a second buffer volume 512, and a plurality of krypton supplies 514. The first compressor 352, and the VPSA module 354 are as described in more detail above with reference to FIG. 3, and will not be described again for the sake of brevity.

The getter module 502 is configured to receive a gas stream output from the VPSA module 354. The getter module 502 comprises a getter, i.e. a deposit of reactive material placed in the gas flow path. The getter may be a coating applied to a surface within the getter module 502. The getter may be a titanium getter, e.g. a hot titanium getter. In operation, when gas molecules strike the getter material, they combine with it chemically or by absorption. Thus, the getter removes amounts of gases from the gas stream. In particular, in this embodiment, the getter is configured to remove one or more gases selected from the group consisting of PFCs, hydrogen, and nitrogen. The getter module 502 is further configured to provide the gas stream (after removal of gases by the getter) to the first pump 504.

The first pump 504 is configured to receive the gas stream output by the getter module 502. The first pump 504 is configured to pump the received gas stream to the third separation module 506.

In operation, the third separation module 506 receives, from the first pump 504, a gas stream comprising a mixture of krypton and helium (and possibly other gases). The third separation module 506 is configured to process this gas stream to separate the krypton from the helium (and possibly other gases). Any appropriate gas separation technique may be used by the third separation module 506. For example, the third separation module 506 may comprise a membrane, a filter, or a metal-organic framework (MOF) to separate the krypton from the helium.

The third separation module 506 is further configured to output the separated helium gas, and to send the helium gas to the turbo pump 312 and/or the pumping module 314, to which the helium is supplied as the further purge gas. In this embodiment, the third separation module 506 provides the separated helium to the turbo pump 312 and/or the pumping module 314 via the second pump 508 (which pumps the helium) and the first buffer volume 509, which may temporarily store the helium. Thus, the further purge gas (i.e. helium) is re-used/recycled.

The third separation module 506 is further configured to output the separated krypton to, for example, a krypton storage module 326, via the second buffer volume 512 as shown in FIG. 5, or to a distribution module 228 such as that shown in FIG. 2 and described in more detail earlier above. The krypton storage module 326 may be similar to or the same as the storage module 126 described in more detail earlier above with reference to FIG. 1.

The second buffer volume 512 is configured to receive the separated krypton from the third separation module 506. The second buffer volume 512 is further configured to receive additional (e.g. top-up) krypton from the krypton supplies 514. The flow of the additional krypton from the krypton supplies 514 is regulated or controlled by a plurality of sixteenth valves 520. The sixteenth valves 520 are two-way valves. The sixteenth valves 520 are configured to be controlled (e.g. by a control module such as control module 116 or control module 216 described in more detail above with reference to FIGS. 1 and 2) to control the flow of krypton from the krypton supplies 514 and the second buffer volume 512. The second buffer volume 512 is configured to store a mixture of the separated krypton from the third separation module 506 and the additional krypton from the krypton supplies 514. The second buffer volume 512 is configured to output stored krypton to the krypton storage module 326.

Optionally, an analysis module 516 is implemented to perform an analysis of the compositions of the mixture stored in the second buffer volume 512.

Thus, a further embodiment of a krypton recovery system is provided.

In the above embodiments, krypton is used in the process chambers and recovered by the krypton recovery system. However, in other embodiments, the systems used a different noble gas instead of or in addition to krypton. Examples of other appropriate noble gases include but are not limited to argon and xenon. Blends or mixtures of multiple different noble gases, such as any combination of argon, xenon, and krypton, may be used.

In the above embodiments, there is a plurality of process chambers. However, in other embodiments there is only a single process chamber.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A system comprising:
a pumping system configured to pump respective exhaust gases from each of a plurality of chemical etching process chambers and to combine the exhaust gases to provide a combined exhaust gas wherein the pumping system comprises:
  a plurality of turbo pumps, each turbo pump in the plurality of turbo pumps configured to pump the exhaust gas from a respective one of the plurality of process chambers;
  a plurality of perfluorocompound (PFC) removal or conversion modules, each of the plurality of PFC removal or conversion modules coupled to an output of a respective turbo pump of the plurality of turbo pumps and comprising a plasma configured to remove or convert PFCs from the exhaust gas stream output by the respective turbo pump;
  a pumping module configured to receive and combine the respective streams of exhaust gas from the plurality of PFC removal or conversion modules and to pump the combined exhaust gas; and
a noble gas recovery system configured to process the combined exhaust gas to remove one or more noble gases therefrom, the noble gas recovery system comprising:
  a wet scrubber configured to perform a scrubbing process on the combined exhaust gas from the pumping module;
  a gas chromatography separation module configured to receive a gas stream from the wet scrubber and to separate one or more noble gases from other components of the gas stream received from the wet scrubber using a gas chromatography process, wherein the gas chromatography separation module is configured to receive a carrier gas for use in transfer of the gas stream received from the wet scrubber through the gas chromatography separation module;
  a separation module to separate the one or more noble gases from the carrier gas; and
  a purification module configured to receive one or more noble gases output by the separation module and purify the received one or more noble gases.

2. The system of claim 1, wherein:
the separation module produces a gas containing the carrier gas and other components; and
the noble gas recovery system further comprises a further separation module to separate the other components of the gas produced by the separation module from the carrier gas.

3. The system of claim 2, wherein the separated carrier gas is reused or recycled by the gas chromatography separation module.

4. The system of claim 1, wherein the carrier gas is helium.

5. The system of claim 1, wherein the noble gas recovery system further comprises a drier configured to perform a drying process on a gas stream output from the wet scrubber.

6. The system of claim 1 wherein the separation module comprises a metal-organic framework (MOF).

7. The system of claim 1 wherein the purification module is configured to perform cryogenic purification.

* * * * *